June 17, 1947.                H. HOLLER ET AL                2,422,623
            PROCESS FOR THE GENERATION OF ACETYLENE
                  FROM CALCIUM CARBIDE AND WATER
                         Filed March 6, 1939

*Fig. 1.*

Water (Less than that required to complete the reaction) → Dry Generator / Separator ← Calcium Carbide
→ Acetylene
↓ Dry Calcium Hydroxide
↓ Calcium Carbide Residue

*Fig. 2.*

Water (Less than that required to complete the reaction) → Dry Generator / Separator ← Calcium Carbide
→ Acetylene
↓ Dry Calcium Hydroxide
↓ Calcium Carbide Residue → Water → Generator → Acetylene

*Fig. 3.*

Water (Less than that required to complete the reaction) → Dry Generator / Separator ← Calcium Carbide
→ Acetylene
↓ Dry Calcium Hydroxide
↓ Calcium Carbide Residue → Water → Wet Generator → Acetylene

*Fig. 4.*

Water (Less than that required to complete the reaction) → Dry Generator / Separator ← Calcium Carbide
→ Acetylene
↓ Dry Calcium Hydroxide
↓ Calcium Carbide Residue (recycled)

INVENTORS
HERMANN HOLLER
OTTO MUES
BY
    ATTORNEYS

Patented June 17, 1947

2,422,623

UNITED STATES PATENT OFFICE 2,422,623

PROCESS FOR THE GENERATION OF ACETYLENE FROM CALCIUM CARBIDE AND WATER

Hermann Holler, Frankfort-on-the-Main, and Otto Mues, Georgsmarienhutte, near Osnabruck, Germany; vested in the Attorney General of the United States Application March 6, 1939, Serial No. 260,146
In Germany March 5, 1938

Sections 3 and 14, Public Law 690, August 8, 1946.
Patent expires March 5, 1958

2 Claims. (Cl. 48—216)

(Granted under the provisions of sec. 14, act of March 2, 1927; 357 O. G. 5)

The present invention relates to a process for the generation of acetylene from calcium carbide and water.

In the processes hitherto known for the generation of acetylene from calcium carbide and water the large amount of water necessary for removal of the heat produced is disadvantageous because on the one hand it causes a considerable loss of acetylene, and, on the other hand the calcium hydroxide produced is obtained in the form of a mud-like mass and can thus be separated and worked up only with difficulty. Processes have already been proposed whereby a practically dry calcium hydroxide can be obtained by adding to the carbide, generally present in the form of pieces, only a limited amount of water, part of which serves for the chemical reaction, while the evaporation of the rest absorbs and removes the heat of reaction.

These "dry-gasification" processes are carried out as follows: during the entire reaction, namely until the evolution of gas from the carbide is practically complete, the pieces of carbide and the calcium hydroxide formed remain together and when the reaction is finished the pulverulent lime is removed from the generator. Since, however, pari passu with the decreasing amount of carbide in the mixture of calcium carbide and calcium hydroxide the speed of evolution of gas continuously diminishes owing to the fact that the amount and surface of the carbide continuously decrease, it is absolutely essential to use a generator for the complete gasification in which the path of single grains of calcium carbide is as long as possible. It is, therefore, necessary to use comparatively large generators which are costly in respect of construction and maintenance and may be rather complicated.

Another difficulty in such dry-gasification process resides in the fact that the amount of water to be added must always be controlled in accord with the amount of carbide present in the generator in order to obtain the practically dry calcium hydroxide desired. Hence such process requires constant and exact attention, particularly with reference to the water supply which, if not regulated, may lead to the production of moist slaked lime or to the presence of still ungasified particles of carbide in the residue.

The present invention avoids these drawbacks by reacting with a limited amount of water only the greater portion of the carbide introduced into a dry-generator so as to obtain practically dry calcium hydroxide, and separating the incompletely reacting remaining portion of the carbide, not yet gasified, from the hydroxide formed, and removing it from the generator to be introduced either into another generator or into the same generator.

Various processes are known for separating in dry-generators the carbide from the hydroxide immediately after the latter has been formed. In this case the layer of calcium hydroxide surrounding each grain of calcium carbide is removed so that the water in the generator can have access to each grain as easily as possible. The carbide is, however, not removed from the generator, but remains therein together with the hydroxide until the gasification process in the generator is complete.

Another process is known, in which a metal oxide is used as a carrier for a thin carbide coating. The oxide particles forming the carriers are reconducted in a cycle into the apparatus for producing calcium carbide after the gasification of the carbide coating is complete. In view of the entirely different parent materials used in such process a subdivision of the actual gasification process prescribed by the present invention is, however, unnecessary.

Fig. 1 is a flow diagram illustrating the process of the invention;

Fig. 2 is a flow diagram illustrating a modification of the invention;

Fig. 3 is a flow diagram illustrating a variation of the process shown in Fig. 2; and Fig. 4 is a flow diagram illustrating another modification of the invention.

In the present invention as shown in Fig. 1, at a certain moment the unreacted particles of carbide remaining after the main portion thereof has been gasified may be removed from the generator, after having been separated from the calcium hydroxide, and these carbide particles may be then subjected to further reaction with water in any desired manner, as shown in Fig. 2. If this carbide remainder is gasified separately, an excess of water may be used, as shown in Fig. 3, so that the lime is obtained in this case in the form of mud. By such a subdivision of the gasification process, a certain amount of the mud-like calcium hydroxide is produced; however, this amount is very small in comparison with the amount of dry lime obtained so that, compared with the simplification of the construction of the generator as well as with the economical advantages attained thereby it is of little importance.

Furthermore, by the premature removal of a part of the carbide it is unnecessary to control constantly the main gasification in respect of the sufficiency of the amount of water added, since the rest of the incompletely reacted carbide particles not yet gasified do not remain mixed with the residue but are removed therefrom and subjected to separate gasification.

The calcium hydroxide formed during the main gasification is suitably separated from the carbide pieces still present only when the main part of the carbide has been gasified and merely small pieces of the carbide remain to be gasified. In this case the calcium hydroxide is then suitably screened from the carbide, so that the hydroxide is caused to fall into a collecting vessel or the like from which it may be removed and further worked up for use as fertilizer or it is stored in bags, whereas the remaining pieces of carbide, mixed, if desired, with fresh carbide, are reconducted into either the dry-generator, as shown in Fig. 4, or into a wet-generator, as shown in Fig. 3, of known construction which operates with an excess of water.

Alternatively, the calcium hydroxide may be separated from the ungasified carbide by causing a current of gas to act in the manner of a sifting current; preferably, however, a circulating current of part of the acetylene produced, is caused to pass through the mixture, whereby the lightest of the hydroxide particles are carried away and brought into a chamber where they deposit while the carbide remains in the generator.

The process may consist either in a continuous separation of the carbide from the calcium hydroxide, or in an intermittent separation of the two compounds. Furthermore, the carbide particles may either be finally gasified immediately after separation of the hydroxide or they may be brought into a collecting chamber from which they are introduced, as required, into the generator in which the gasification occurs.

We claim:
1. In a process for the production of acetylene and substantially dry calcium hydroxide by reacting calcium carbide with a limited amount of water in a dry-generator, the steps which comprise treating the carbide introduced into the dry-generator with insufficient water to completely react all of said carbide so that no excess of water occurs in the generator and so that the calcium hydroxide formed is always obtained in a substantially dry pulverulent state, separating any remaining unreacted particles of the carbide from the calcium hydroxide, removing, collecting and again introducing such remaining particles of carbide into the inlet portion of said dry-generator.

2. In the process for the production of acetylene and substantially dry calcium hydroxide by treating calcium carbide with a limited amount of water in a dry-generator, the steps which comprise reacting only the main portion of the carbide introduced into the dry-generator with such a limited amount of water that no excess of water occurs in the generator and the calcium hydroxide formed is always obtained in a substantially dry pulverulent state, separating any remaining unreacted particles of the carbide from the calcium hydroxide, removing and again introducing such separated particles of carbide into said dry-generator together with fresh carbide.

HERMANN HOLLER.
OTTO MUES.

REFERENCES CITED

The following references are of record in the file of this patent:

UNITED STATES PATENTS

| Number | Name | Date |
|---|---|---|
| 541,429 | Dickerson | June 18, 1895 |
| 575,677 | Fuller | Jan. 19, 1897 |
| 1,872,741 | Jane | Aug. 23, 1932 |
| 2,122,889 | Mues | July 5, 1938 |
| 1,996,185 | Wulff | Apr. 2, 1935 |
| Re. 20,527 | Weibezahn | Oct. 5, 1937 |
| 1,947,120 | Weibezahn | Feb. 13, 1934 |
| 2,180,085 | Holler | Nov. 14, 1939 |